(12) United States Patent
Stephens

(10) Patent No.: US 7,370,828 B2
(45) Date of Patent: May 13, 2008

(54) ROTARY WING AIRCRAFT

(75) Inventor: Thomas G. Stephens, Grand Prairie, TX (US)

(73) Assignee: X Blade Systems LP, Dallas, TX (US)

( * ) Notice: Subject to any disclaimer, the term of this patent is extended or adjusted under 35 U.S.C. 154(b) by 242 days.

(21) Appl. No.: 11/121,648

(22) Filed: May 4, 2005

(65) Prior Publication Data
US 2006/0249621 A1 Nov. 9, 2006

(51) Int. Cl.
B64C 27/22 (2006.01)
(52) U.S. Cl. .......................................... 244/9; 244/12.1
(58) Field of Classification Search ................... 244/9, 244/10, 19, 21, 12.1, 12.6
See application file for complete search history.

(56) References Cited

U.S. PATENT DOCUMENTS

| 1,532,902 | A | * | 4/1925 | Immers | 244/9 |
| 1,631,861 | A | * | 6/1927 | Hanschke | 244/9 |
| 1,737,210 | A | * | 11/1929 | Weltner | 244/12.1 |
| 1,761,053 | A | | 6/1930 | Rystedt | |
| 1,776,994 | A | * | 9/1930 | Chattin | 244/12.1 |
| 1,796,016 | A | | 3/1931 | Frickee | |
| 1,820,919 | A | | 9/1931 | Massey | |
| 1,975,098 | A | * | 10/1934 | Gardner | 244/9 |
| 2,037,377 | A | | 4/1936 | Gardner | |
| 2,379,875 | A | | 7/1945 | Boyea | |
| 2,501,315 | A | * | 3/1950 | Christian | 244/9 |
| 3,801,047 | A | * | 4/1974 | Dell'Aquila | 244/19 |
| 4,166,595 | A | * | 9/1979 | Ango | 244/20 |
| 4,194,707 | A | | 3/1980 | Sharpe | |
| 4,418,880 | A | * | 12/1983 | de Waal | 244/199.1 |
| 4,527,757 | A | * | 7/1985 | Gonzales et al. | 244/20 |
| 5,100,080 | A | * | 3/1992 | Servanty | 244/9 |
| 5,265,827 | A | | 11/1993 | Gerhardt | |
| 6,007,021 | A | | 12/1999 | Tsepenyuk | |
| 6,352,219 | B1 | * | 3/2002 | Zelic | 244/12.1 |
| 6,450,446 | B1 | | 9/2002 | Holben | |
| 6,464,166 | B1 | * | 10/2002 | Yoeli | 244/12.1 |
| 6,513,752 | B2 | * | 2/2003 | Carter, Jr. | 244/8 |
| 6,607,162 | B2 | * | 8/2003 | Warsop et al. | 244/12.6 |

(Continued)

FOREIGN PATENT DOCUMENTS

EP 1394039 A1 * 3/2004

(Continued)

OTHER PUBLICATIONS

Kim, Seung Jo, et al., Design and Development of Unmanned VTOL, Cyclocopter, Seoul National University, Seoul, Korea, date unknown, 6 pp.

(Continued)

Primary Examiner—Rob Swiatek
Assistant Examiner—Joseph W Sanderson
(74) Attorney, Agent, or Firm—Gardere Wynne Sewell, LLP

(57) ABSTRACT

A rotary wing aircraft is provided with longitudinally oriented counter-rotating rotors with circumferentially spaced variable pitch elongated rotor blades connected at their opposite ends to rotatable support rings mounted on the aircraft fuselage. Rotor downwash may be guided laterally and longitudinally by respective sets of moveable guide vanes. Propulsion may be obtained by an engine providing thrust and power take-off for driving the rotors. An auxiliary or second engine may be drivingly connected to the rotors.

18 Claims, 5 Drawing Sheets

U.S. PATENT DOCUMENTS

| | | | |
|---|---|---|---|
| 6,622,472 B2 * | 9/2003 | Plumpe, Jr. | 60/204 |
| 6,817,570 B2 * | 11/2004 | Yoeli | 244/12.1 |
| 6,845,940 B2 * | 1/2005 | Hashimoto | 244/9 |
| 2004/0011922 A1 | 1/2004 | Hashimoto | |

FOREIGN PATENT DOCUMENTS

| | | |
|---|---|---|
| KR | 10-0558462 | 4/2005 |
| KR | 10-0558463 | 4/2005 |
| WO | WO 2004054875 A1 * | 7/2004 |
| WO | WO 2005049422 A2 * | 6/2005 |

OTHER PUBLICATIONS

Yun, Chul Yong, et al., Thrust Control Mechanism of VTOL UAV Cyclocopter With Cycloidal Blades System, Department of Aerospace Engineering, Seoul National University, Seoul, Korea, date unknown, 2 pp.

Park, Jin Woo, et al., Optimal Blade System Design of a New Concept VTOL Vehicle Using the Departmental Computing Grid System, School of Aerospaceand Mechanical Engineering, Seoul National University, Seoul, Korea, date unknown, 10 pp.

Kim, Seung Jo, et al., "Design and Performance of Tests of Cycloidal Propulsion Systems," American Institute of Aeronautics and Astronautics, Apr. 7, 2003, 11 pp.

Kim, Seung Jo, et al., "Aerodynamic Loads Prediction of the Cycloidal Blades System of UAV Cyclocopter Considering Virtual Camber Effect," School of Mechanical and Aerospace Engineering, Seoul National University, Oct. 7, 2003, 8 pp.

Kim, Seung Jo, et al., "The Cyclocopter: A New Type of U.A.V.," School of Mechanical and Aerospace Engineering, Seoul National University, Oct. 7, 2003, 7 pp.

Yun, Chul Yong, et al., "A New VTOL UAV Cyclocopter with Cycloidal Blades System," Jun. 7, 2004, 18 pp.

Hwang, In Seong, et al., "Structural Design of Cyclocopter Blade System," American Institute of Aeronautics and Astronautics, Apr. 18, 2005, 7 pp.

Hwang, In Seong, et al., "Multidisciplinary Optimal Design of Cyclocopter Blade System," American Institute of Aeronautics and Astronautics, Apr. 18, 2005, 7 pp.

* cited by examiner

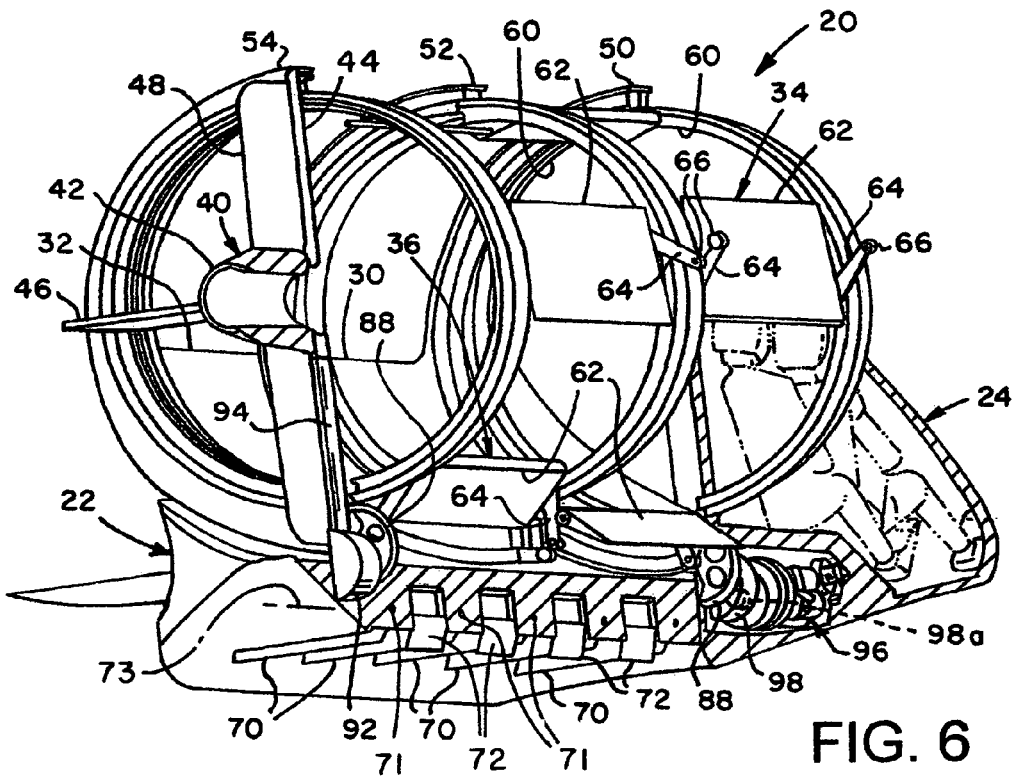
FIG. 6
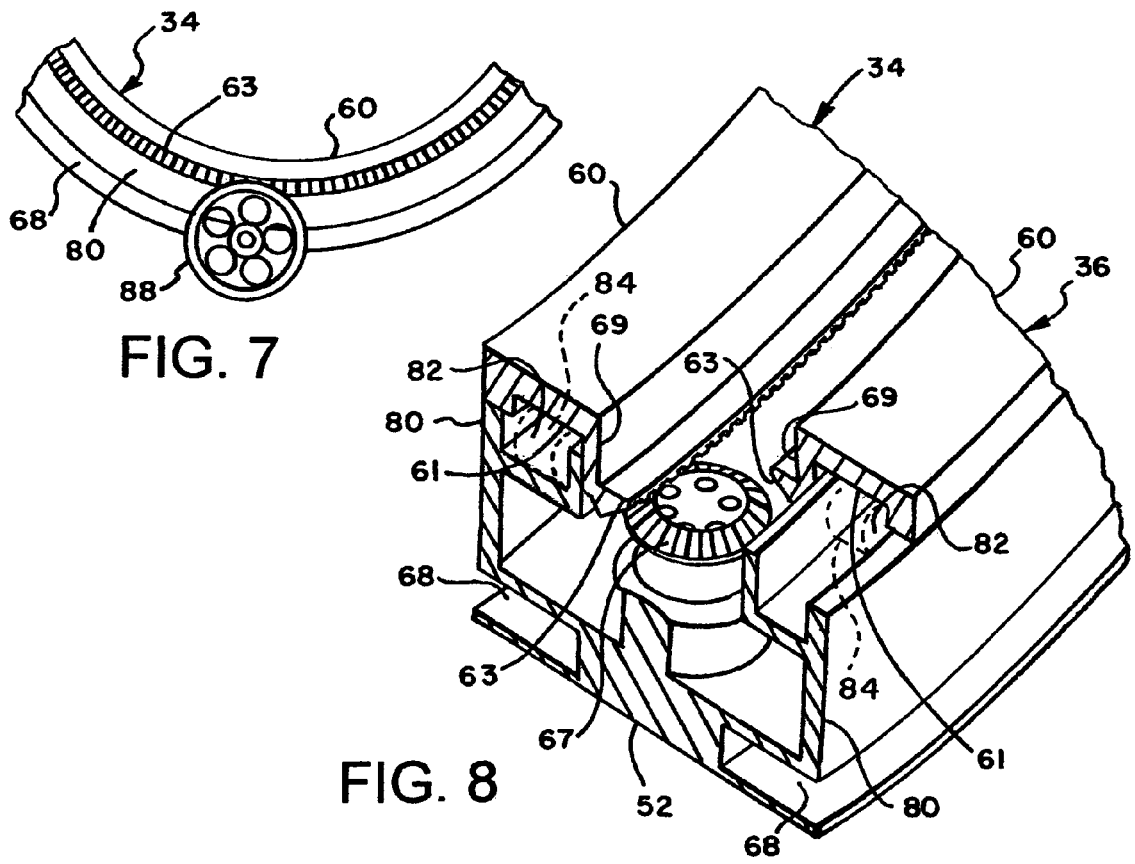
FIG. 7
FIG. 8

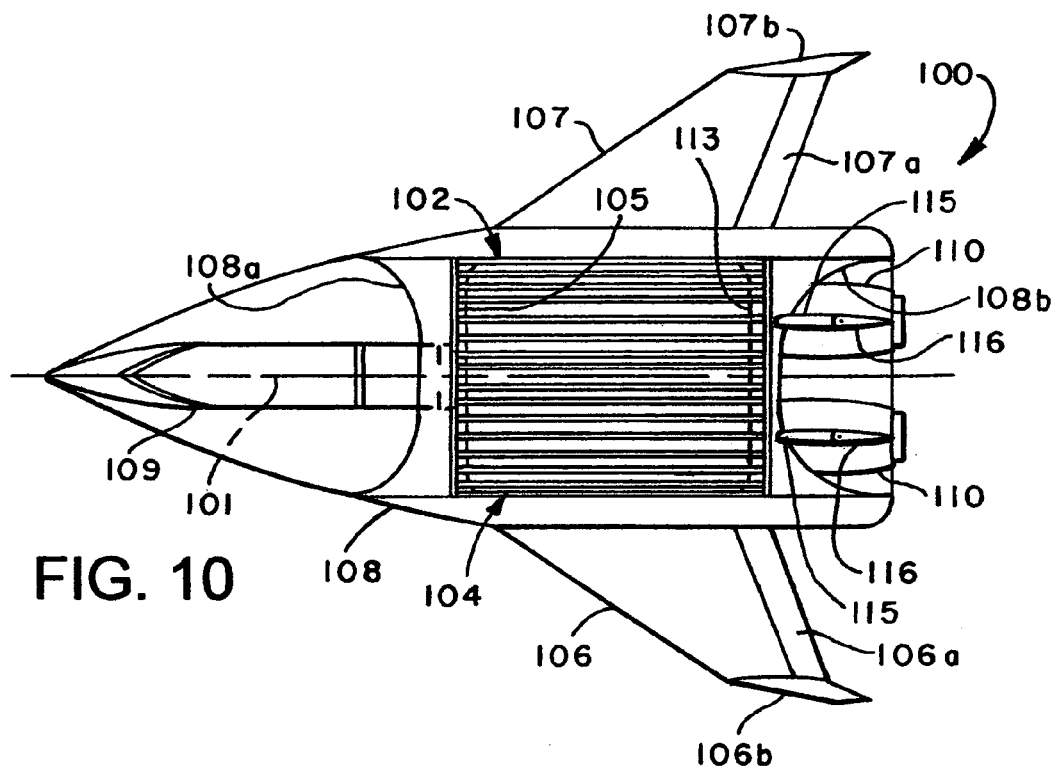
FIG. 10
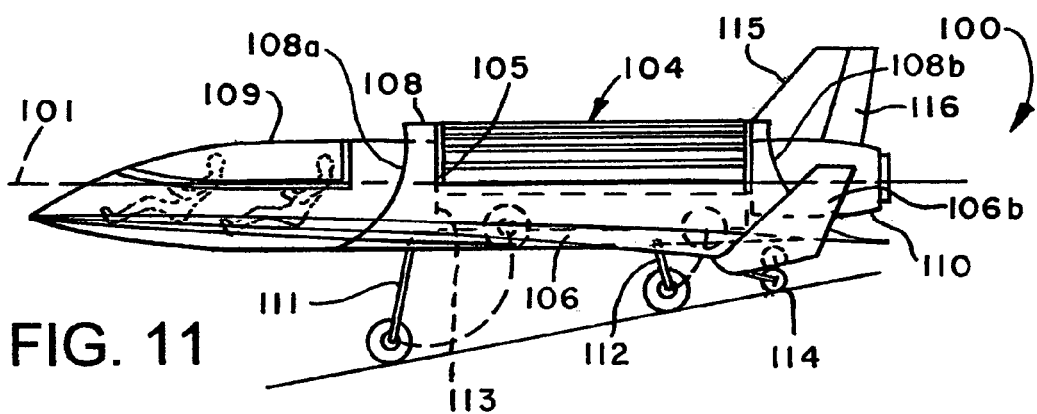
FIG. 11
FIG. 12

ROTARY WING AIRCRAFT

BACKGROUND OF THE INVENTION

The continuing rapid development of aviation technologies with respect to aircraft structures, propulsion systems and navigation systems augers well for expanded use of aircraft by professional aviators and the general public. However, one drawback to the continued proliferation of general aviation aircraft, for example, is with respect to the space needs for fix-winged aircraft as well as conventional rotary wing aircraft. Fixed wing aircraft, of course, require substantial space for take-off and landing operations and conventional rotary wing aircraft require substantial space for storage. Accordingly, there has been a continuing need to develop aircraft which have short take-off and landing (STOL) or substantially vertical take-off and landing (VTOL) capabilities.

Certain efforts have been made to develop rotary wing aircraft with rotors which are characterized by elongated blades arranged in a circular pattern and secured to ring-like support structures at opposite ends of the blades. However, prior art efforts have been focused primarily on rotary wing aircraft with rotors which are arranged for rotation about axes normal to the longitudinal axis of the aircraft and its direction of flight. Certain efforts have been put forth to develop rotary wing aircraft of the general type discussed above which have rotors arranged longitudinally. However, prior art efforts have indicated to be complicated and lacking stability in the event of failure of one or more rotor sets and space requirements for prior art rotary wing aircraft have been, generally, similar to the needs of conventional helicopter aircraft.

Accordingly, there has been a continuing need and desire to provide aircraft which are compact, stable in flight, capable of STOL or VTOL operations and which meet the conventional needs of general aviation as well as commercial aircraft. It is to these ends that the present invention has been developed.

SUMMARY OF THE INVENTION

The present invention provides an improved rotary wing powered aircraft. The present invention also provides an improved rotary wing aircraft with plural rotors which are arranged for rotation about an axis, preferably, coincident with or parallel to the longitudinal axis of the aircraft and wherein the rotors are counter-rotating so as to substantially eliminate undesirable torque reaction characteristics.

In accordance with one aspect of the present invention, a rotary wing aircraft is provided of a type which includes, preferably, plural rotors arranged for rotation about an axis substantially coincident with or parallel to the longitudinal central axis of the aircraft. The rotors are of a type characterized by elongated variable pitch blades which are pivotally supported on spaced-apart, generally cylindrical ring members mounted for rotation with respect to the aircraft frame or fuselage. The rotors are arranged to provide for change of pitch of the rotor blades as they rotate through one revolution so that a resultant force and rotor wake or downwash is directed, generally, vertically downwardly. Moreover, the rotors are interconnected and are operable to rotate in opposite directions so as to minimize adverse torque reaction on the aircraft.

In accordance with another aspect of the present invention a rotary wing aircraft is provided which includes one or more multi-bladed rotors arranged to propel air through a large duct or opening in the aircraft fuselage in a generally downward direction and wherein adjustable guide vanes are disposed in the opening to bias the flow of air in different directions for controlling movement of the aircraft.

Still further, the invention includes an arrangement of rotors in a rotary wing aircraft wherein a propulsion engine may share power required to propel the aircraft in a forward direction with power required to rotate the aircraft rotors. Still further, the rotary wing aircraft of the invention may utilize plural engines arranged to provide power input to the rotors through a unique power train. One of the engines may be utilized as an auxiliary or back-up engine in the event of failure of or power reduction from a main engine.

In accordance with yet a further aspect of the invention, a rotary wing aircraft is provided with an arrangement of fore and aft disposed rotors which are operable to rotate about axes which are parallel to the longitudinal axis of the aircraft. The aircraft may be equipped with lift and stability control surfaces which may also include control surfaces, such as an elevator and/or a rudder. The aircraft may include fixed wings of relatively short span, but provided for increased lift and stability about the aircraft roll axis.

Those skilled in the art will further appreciate the above-mentioned advantages and superior features of the rotary wing aircraft of the invention together with other important aspects thereof upon reading the detailed description which follows in conjunction with the drawing.

BRIEF DESCRIPTION OF THE DRAWINGS

FIG. 6 is a cut-away perspective view of the aircraft shown in FIGS. 1-5 and illustrating certain features of the aircraft;

FIG. 7 is a detail view illustrating a portion of an auxiliary drive train;

FIG. 8 is a detail perspective view illustrating a driving connection between fore and aft mounted rotors for the aircraft shown in FIGS. 1-6;

FIG. 10 is a top plan view of another preferred embodiment of a rotary wing aircraft in accordance with the invention;

FIG. 11 is a side elevation of the aircraft shown in FIG. 10; and

FIG. 12 is a rear elevation of the aircraft shown in FIGS. 10 and 11.

DETAILED DESCRIPTION OF THE PREFERRED EMBODIMENTS

Figure 1:
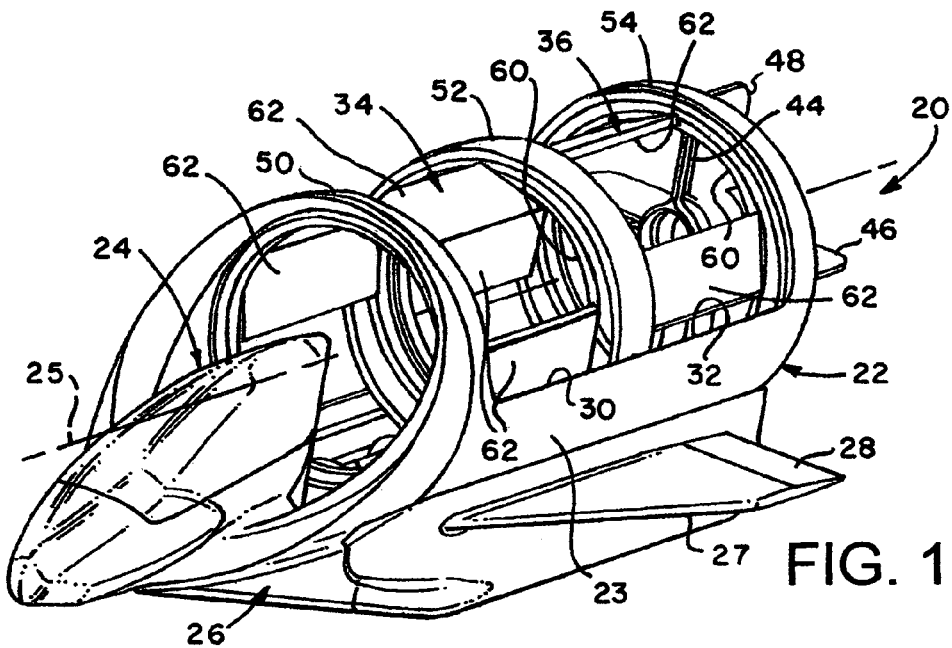
FIG. 1 is a front perspective view of one preferred embodiment of a rotary wing aircraft in accordance with the present invention.

In the description which following like elements are marked throughout the specification and drawing with the same reference numerals, respectively. The drawing figures are not necessarily to scale and certain elements may be shown exaggerated in scale or in somewhat generalized or schematic form in the interest of clarity and conciseness.

Figure 2:
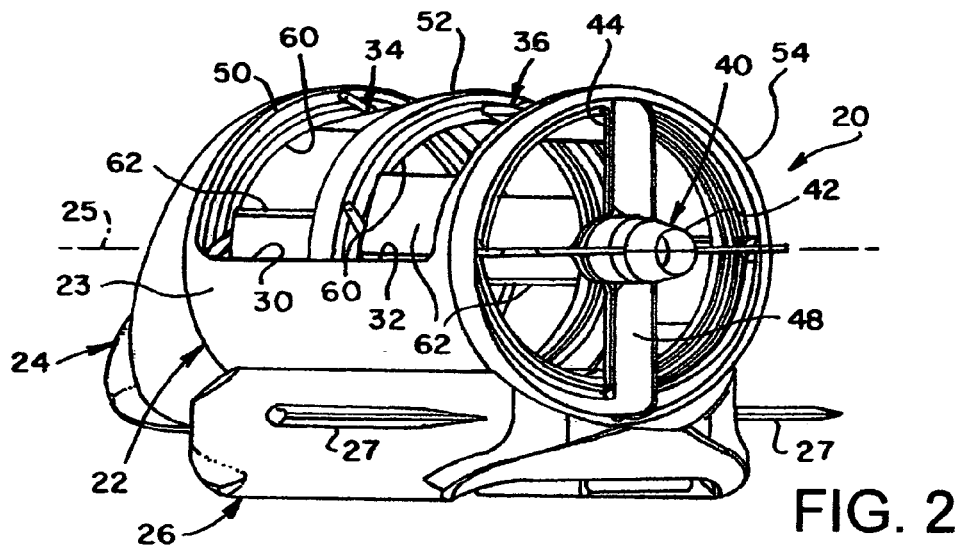
FIG. 2 is rear perspective view of the aircraft shown in FIG. 1.
Figure 3:
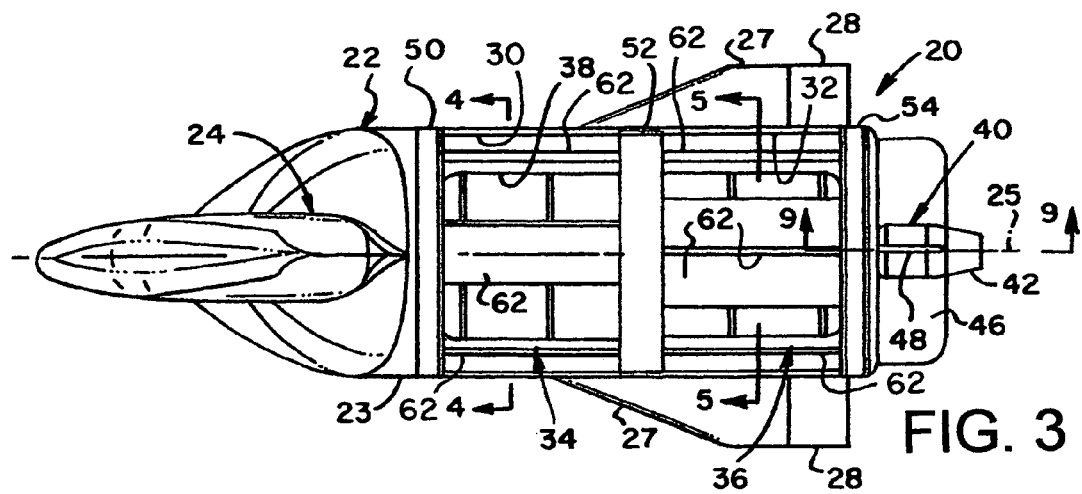
FIG. 3 is a top plan view of the aircraft shown in FIGS. 1 and 2.

Referring now to FIGS. 1 through 3, there is illustrated a rotary wing aircraft in accordance with the invention and generally designated by the numeral 20. The aircraft 20 includes a generally cylindrical elongated fuselage or body 22 which includes, at the forward end thereof, a cabin 24 for flight crew and passengers. The fuselage 22 is further characterized by a depending, blended rectangular body part or section 26 supporting opposed low aspect ratio wings 27. Wings 27 may include conventional control surfaces 28 comprising ailerons or flaps, for example. Conventional landing gear, wheel or skid type, not shown, may be mounted on fuselage section 26.

The fuselage 22 is characterized by a substantially tubular elongated section or body part 23 which is open at opposite ends, defines a central longitudinal axis 25 and is cut-away substantially about its upper half to provide substantial longitudinally spaced openings 30 and 32 to permit air inlet to coaxially aligned counter-rotating rotors 34 and 36. The lower, generally rectangular section 26 of fuselage 22 also defines an elongated generally rectangular duct or opening 38, FIG. 3, directly below rotors 34 and 36. Fuel and/or cargo bays 22t, FIG. 4, may be provided in fuselage section 26, for example. The aircraft 20 includes an aft mounted engine 40, FIGS. 2 and 3, which may comprise a gas turbine engine having a jet nozzle 42, but also adapted for at least partial shaft power take-off as will be described further herein. Engine 40 is mounted on suitable support structure 44, FIGS. 1 and 2, generally along central axis 25, which support structure is also operable to support a horizontal stabilizer which may comprise an elevator 46, and a vertical stabilizer which may also comprise a rudder 48. Fuselage 22 also comprises spaced apart, fixed, generally cylindrical rotor support ring members 50, 52 and 54, which delimit, partially, the openings 30 and 32 in fuselage 22.

Figure 4:
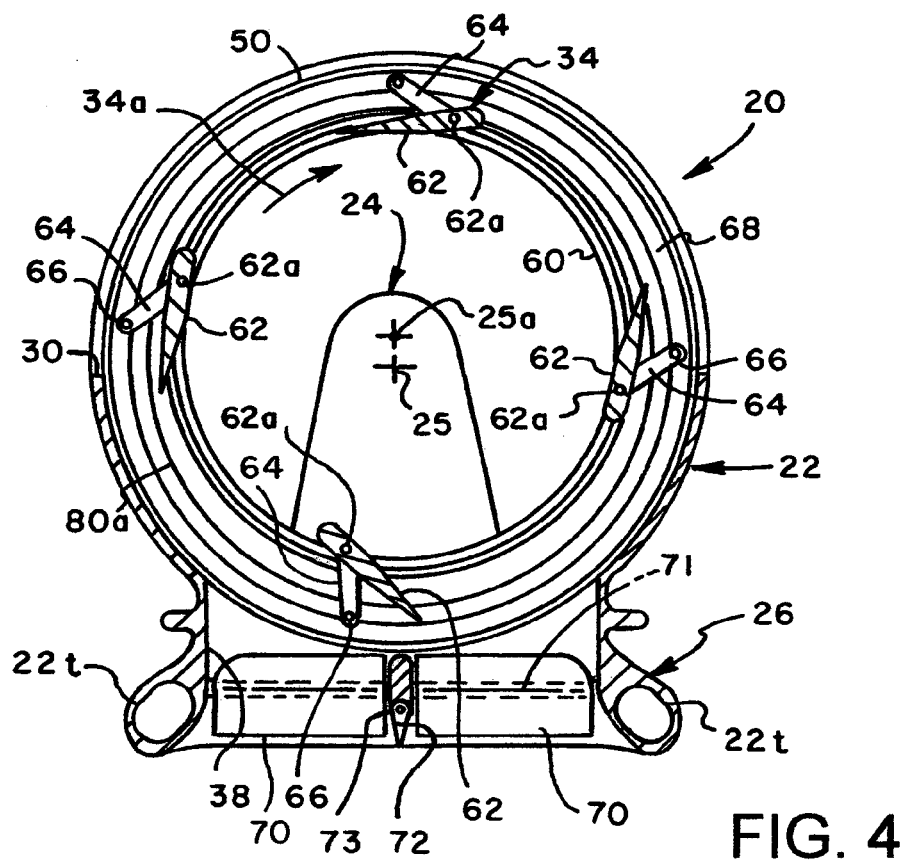
FIG. 4 is a section view taken generally along the line 4-4 of FIG. 3.
Figure 5:
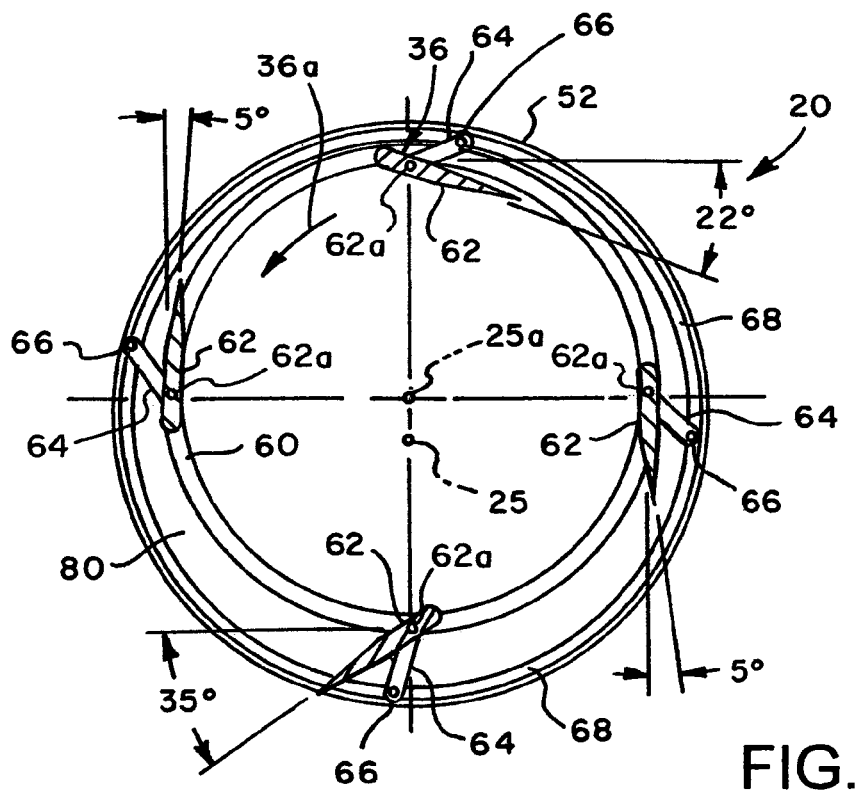
FIG. 5 is a detail section view taken generally along the line 5-5 of FIG. 3 with portions of the fuselage omitted.
Figure 9:
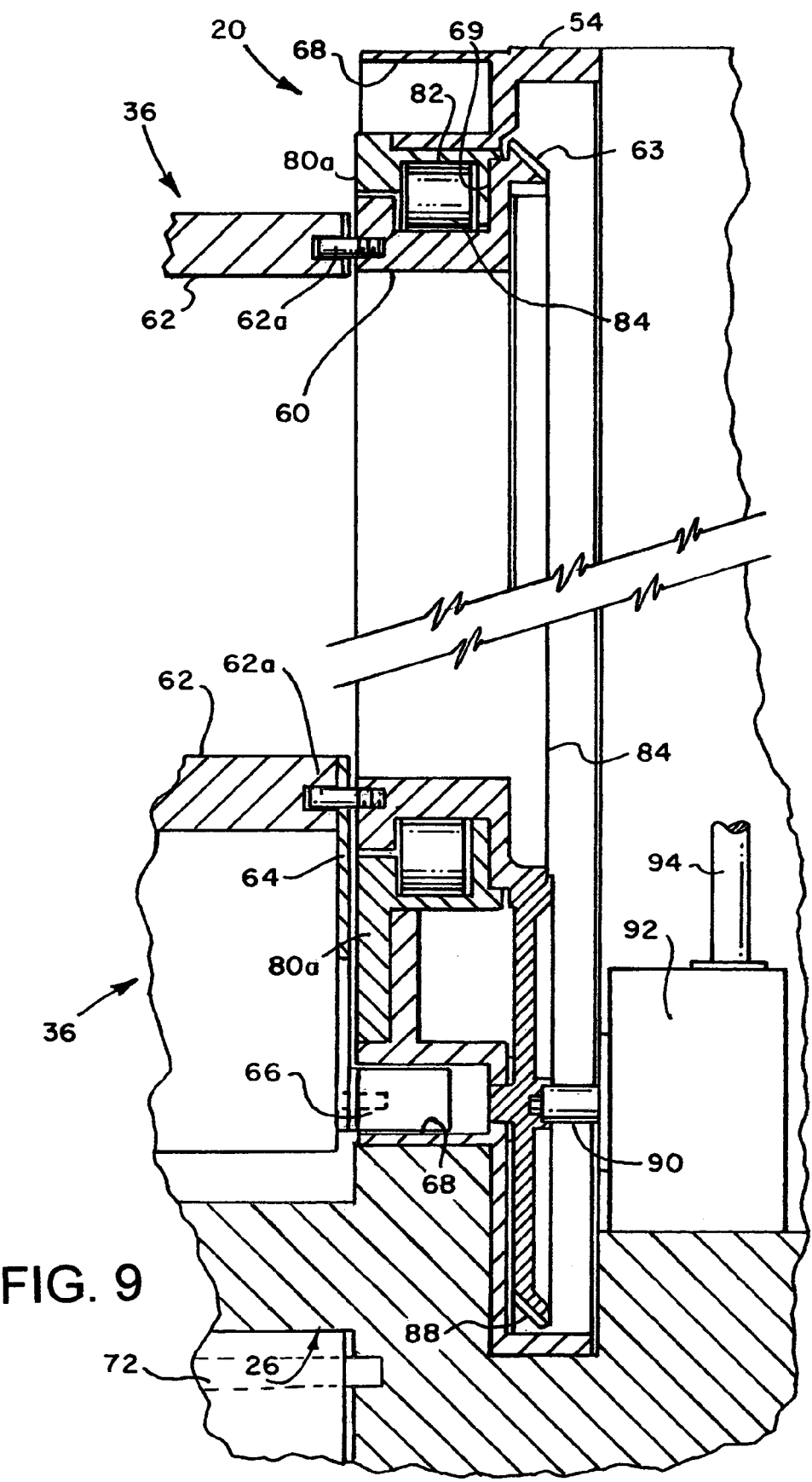
FIG. 9 is a detail section view taken generally along the line 9-9 of FIG. 3.

Referring now to FIGS. 4 and 5 also, rotor 34, FIG. 4, is characterized by spaced apart, cylindrical rotor support rings 60, see FIGS. 1 and 4, which have a radially outward facing channel shaped cross section providing a channel 61, see FIG. 8 also. Support rings 60 support therebetween four circumferentially spaced rotor blades 62, FIG. 4, which are mounted for pivotal movement at their respective opposite ends on rings 60 by respective pivot pins 62a. Rotor blades 62 have an airfoil shaped cross-section which may be symmetrical about a central chord line. Rotor blades 62 are also each provided at their opposite ends with support brackets 64, FIG. 4, the distal ends of which are connected to track follower members 66, see FIG. 6 also. Track followers 66 reside in circular channel shaped tracks 68, see FIGS. 8 and 9, which open in a direction parallel to axis 25. FIGS. 8 and 9 show the configuration of opposed channel shaped tracks 68 formed in support ring 52, and a single channel shaped track 68 for support ring 54, respectively. Support ring 50 is configured similar to ring 54 and includes a channel shaped track 68, FIG. 4. Each channel shaped track 68 is circular but the axis of track 68 is eccentric with respect to the axis of rotor support ring 60. Accordingly, as support rings 60 for rotor 34 rotate with respect to support rings 50 and 52 and fuselage 22 the angle of attack or pitch of rotor blades 62 varies such that the blades produce a lifting effect and generate substantial airflow or rotor wash downwardly through duct or opening 38. The direction of rotation of rotor 34 is indicated by arrow 34a in FIG. 4 with respect to rotor axis of rotation 25a which is displaced, as shown, with respect to the central longitudinal axis 25 of the support rings 50, 52, and 54.

As shown in FIG. 5, exemplary values of pitch angle or angle of attack for rotor blades 62 for rotor 36 are illustrated. The angles are measured between rotor blade chord lines and tangents to the circular arc of rotation of the support rings 60 for rotors 34 and 36. Rotor 36 is also characterized by four circumferentially spaced apart rotor blades 62 and support brackets 64 connected to opposite ends thereof, respectively, and including track followers 66 disposed in corresponding channel shaped guide tracks 68 formed on ring shaped supports 52 and 54, see FIGS. 8 and 9 also. The direction of rotation of rotor 36 with respect to axis 25a, when facing forward and in the same direction as facing when viewing FIG. 4, is indicated by arrow 36a. Accordingly, rotors 34 and 36 rotate in opposite directions, thus tending to cancel, substantially, any adverse reaction torque imposed on the aircraft 20 when the rotors are being rotated to effect lifting of the aircraft. Guide tracks 68 are circular, but may be of other geometries in accordance with rotor blade pitch change requirements of the rotors 34 and/or 36.

Referring to FIGS. 4 through 6, and FIG. 6 in particular, rotor downwash through duct or opening 38 may be guided directionally by sets of spaced apart movable guide vanes including guide vanes 70 which are spaced apart and supported for pivotal movement about axes 71, see FIGS. 4 and 6, normal to the axes 25 and 25a. Guide vanes 70 may be pivoted about their respective axes 71 to direct rotor downwash either forward or aft to assist in controlling and propelling aircraft 20. Still further, a longitudinally oriented set of guide vanes 72 is provided, disposed substantially centrally, and extending longitudinally within opening 38 and supported for pivotal movement about a pivot axis 73, see FIGS. 4 and 6 also. Guide vanes 72 may be remotely controlled to orient rotor downwash airflow laterally with respect to axes 25 and 25a to move aircraft 20 laterally also. The operating positions of both sets of guide vanes 70 and 72 may be controlled from a pilot's cockpit portion of cabin 24 to enhance the maneuverability of aircraft 20.

Referring to FIGS. 8 and 9, each of rotor support rings 60 is provided with a circumferential bevel gear part 63 formed on a flange 69 of channel shaped support ring 60, as illustrated. Bevel gears 63 of adjacent rings 60, FIG. 8, are meshed with one or more idler bevel gears 67, one shown in FIG. 8, supported for rotation on support ring 52 to effect reverse or opposite directions of rotation of rotors 34 and 36. Rotor support rings 60 are supported for rotation about axis 25a spaced from and parallel to central axis 25 of stationary support rings 50, 52, and 54 by respective stationary bearing rings 80 and 80a. Bearing rings 80 may be formed integral with support ring 52, FIG. 8. Bearing ring 80a, FIG. 9, may be formed integral with ring 54 or as a separate part, as shown. Bearing rings 80 and 80a are provided with radially inward facing circumferential channels 82, see FIGS. 8 and 9, in which are disposed spaced apart bearing rollers 84 which support rotor support rings 60 for rotation with respect to bearing rings 80, 80a and fuselage 22 by way of the respective stationary support rings 50, 52, and 54. Bearing rings 80a may require to be split longitudinally and/or laterally to facilitate assembly of these rings with respect to rotor support rings 60 and bearing rollers 84. Conversely, support rings 60 may require to be split laterally and/or longitudinally for purposes of assembly and disassembly of the rotors 34 and 36 with respect to their support structure. Bearing rings 80 may be secured to support ring members 50 and 54, respectively, by conventional fastener means, not shown.

Referring to FIG. 9, rotor 36 is driven by a bevel gear 88 meshed with gear 63 of support ring 60. Gear 88 is drivenly connected to an output shaft 90 of a right angle drive gear transmission 92 which has an input shaft 94. Input shaft 94 is preferably drivenly connected to engine 40, see FIG. 6 also. As mentioned hereinbefore, engine 40 is provided with a suitable shaft power takeoff feature, not shown, for delivering at least part of its power output to shaft 94, the remaining power being delivered as jet thrust via nozzle 42. As further shown in FIG. 9, rotor blades 62, two shown, are supported on rotating support ring 60 by pivot pins 62a, as illustrated. Accordingly, rotors 34 and 36 may be driven in opposite directions of rotation about axis 25a by engine 40 via drive shafting 94, gear transmission 92 and bevel gear 88 which is meshed with integral bevel gear 63 on rotor support ring 60. Power transmission between rotors 34 and 36 is provided by one or more bevel gears 67, one shown, which also accomplishes the change in direction of rotation of rotor 34 with respect to rotor 36.

Referring further to FIGS. 6 and 7, a second or auxiliary engine 96, FIG. 6, may be mounted forwardly in fuselage 22, generally where illustrated, and operable to drive a bevel gear 88 via a gear transmission 98. As shown also in FIG. 7, bevel gear 88, which is drivenly connected to engine 96 via transmission 98, is meshed with the bevel gear 63 of the forwardmost rotor support ring 60 for rotor 34. Gear transmission 98 may incorporate an overrunning clutch 98a, FIG. 6, to avoid back driving engine 96 if engine 40 is operating as the primary power source for the rotors 34 and 36 of aircraft 20. Accordingly, engine 96 may be an auxiliary or emergency power source. However, engine 96 may also comprise a part of the primary power source for the rotors 34 and 36 together with engine 40. Engine 96 may be of a type disclosed and claimed in applicant's co-pending patent application Ser. No. 10/939,010, filed Sep. 10, 2004.

The operation of aircraft 20 is believed to be understandable to those of skill in the art from the foregoing description. Rotation of rotors 34 and 36 under driving force exerted by engine 40 and/or engine 96 generates lift and rotor downwash propelled through opening 38, which downwash may be guided both longitudinally and laterally by the respective sets of guide vanes 70 and 72, as described. The eccentric location of axis of rotation 25a for rotors 34 and 36 with respect to the rotor blade pitch or angle of attack guide channels 68 in support rings 50, 52 and 54 will effect the change in attitude of the rotor blades, as illustrated in FIGS. 4 and 5, to provide effective lifting of the aircraft 20 while directing a substantial amount of rotor wash downwardly through opening 38. Aircraft propulsion in longitudinal directions and some pitch control may be obtained at least partially by movement of guide vanes 70 and by stabilizer/elevator 46 and ailerons or flaps 28. Roll control efforts are minimized due to the counter-rotating rotors 34 and 36, but may be carried out by movement of ailerons 28 and/or guide vanes 72, as needed. Control of aircraft 20 about it yaw axis is provided by stabilizer/rudder 48 and/or, possibly, by deflecting selected ones of vanes 72 in opposite directions. Propulsion of aircraft 20 longitudinally may be obtained via engine 40 by jet propulsion, or ducted fan, or unducted propeller. Engine 40 may, for example, be a reciprocating piston type also, for example.

Materials for and methods of construction of aircraft 20 may be conventional and known to those skilled in the art of aircraft fabrication. The mechanical power transmission systems for aircraft 20 may also be fabricated using conventional materials, components and practices known in aircraft power transmission systems.

Referring to FIGS. 10 through 12, another preferred embodiment of a rotary wing aircraft in accordance with the invention is illustrated and generally designated by the numeral 100. Aircraft 100 is also characterized by longitudinally oriented rotors 102 and 104 mounted within an opening 105 in a fuselage 108, which fuselage is constructed in some respects similar to the fuselage 22 and includes an enclosed forward disposed cabin/cockpit 109. However, unlike the aircraft 20, rotors 102 and 104 are mounted side by side with respect to a longitudinal central axis 101 of aircraft 100. Aircraft 100 is also provided with opposed, low to moderate aspect ratio wings 106 and 107. Propulsion for rotors 102 and 104 may be provided by side by side aft mounted engines 110 which may be gas turbine types providing at least some jet thrust and which may be adapted for partial shaft power take-off for driving rotors 102 and 104 directly or generally in the same manner as for the rotors for aircraft 20. Rotor downwash is conducted from fuselage 108 via a duct 113, FIGS. 11 and 12, which opens through the bottomside of fuselage 108. Fuselage 108 is preferably provided with openings 108a and 108b at opposite ends, in a manner similar to fuselage 22.

Aircraft 100 is provided with tandem, fuselage mounted, main landing gear members 111 and 112 and wingtip mounted auxiliary landing gear members 114, as illustrated. Landing gear members 111, 112 and 114 may be retractable. Yaw control of aircraft 100 may be provided by spaced apart vertical stabilizers 115 and rudders 116. Roll control requirements are minimized by counter rotating rotors 102 and 104. Roll control may be provided by combination ailerons and flaps 106a, 107a, FIG. 10. Upturned wingtip airfoil members or winglets 106b and 107b may be provided also, as shown. Aircraft 100 may be constructed using, generally, the same techniques and materials as aircraft 20. Aircraft 100 enjoys the same benefits of construction and operation as the aircraft 20 but may be suited for higher speeds and greater maneuverability operations, such as might be required for military use.

Although preferred embodiments of the invention have been described in detail herein, those skilled in the art will recognize that various substitutions and modifications may be made without departing from the scope and spirit of the appended claims.

What is claimed is:

1. A rotary wing aircraft comprising:
    a fuselage including an elongated body part including a longitudinally extending opening or openings formed in an upper portion of said body part, a lower body part including an exit duct;
    spaced apart coaxial counter-rotating rotors mounted on said fuselage for rotation in opposite directions, said rotors including plural, circumferentially spaced apart, longitudinally extending rotor blades supported for change in pitch or angle of attack during rotation thereof to provide lifting effect for said aircraft, the rotor blades rotating about a longitudinal centerline of the fuselage; and
    engine means driveably connected to said rotors.

2. The aircraft set forth in claim 1 wherein:
    said rotors are arranged in tandem and with respect to an axis of rotation at least substantially parallel to a longitudinal axis of said aircraft.

3. The aircraft set forth in claim 1 wherein:
    each of said rotors include the spaced apart rotor support rings supported for rotation with respect to said fuselage, said rotor support rings being interconnected by spaced apart longitudinally extending rotor blades supported by said support rings for limited pivotal movement with respect thereto.

4. The aircraft set forth in claim 3 wherein:

said rotor support rings are supported by stationary bearing rings disposed on said fuselage.

5. The aircraft set forth in claim 4 wherein:

said bearing rings are supported at spaced apart stationary support ring members, each of said support ring members including a generally circular guide track having an axis eccentric with respect to the axis of rotation of said rotors.

6. The aircraft set forth in claim 5 wherein:

said rotor blades are connected to brackets at least at one end thereof, respectively, which brackets are connected to respective track followers, said track followers being disposed in one of said guide tracks associated with said stationary support ring members, respectively, for effectively changing one of the pitch and angle of attack of said rotor blades during rotation thereof to provide a lifting effect on said aircraft.

7. The aircraft set forth in claim 4 wherein:

power transmission means drivingly connected to at least one of said rotor support rings for transmitting power to said rotors, said power transmission means including a gear meshed with a gear mounted on at least one of said rotor support rings.

8. The aircraft set forth in claim 7 including:

idler gear means engaged with gear means formed on adjacent rotor support rings for respective ones of said rotors for at least one of transmitting power from one rotor to another and for driving one rotor in a direction opposite to that of the other rotor.

9. The aircraft set forth in claim 4 wherein:

said rotor blades have an airfoil cross-section shape.

10. The aircraft set forth in claim 1 including:

auxiliary engine means operable to be drivingly connected to at least one of said rotors.

11. The aircraft set forth in claim 10 wherein:

said auxiliary engine means is drivingly connected to said one rotor via power transmission means.

12. The aircraft set forth in claim 11 wherein:

said power transmission means includes an overrunning clutch.

13. The aircraft set forth in claim 1 wherein:

said rotor blades are mounted for pivotal movement on respective rotor support rings, respectively, and said rotor blades are guided for limited pivotal movement with respect to said rotor support rings for effecting a change of pitch or angle of attack of said rotor blades with respect to their directions of rotation, respectively.

14. The aircraft set forth in claim 1 wherein:

said fuselage includes a cabin mounted forwardly on said elongated body part and said engine means is mounted aft on said elongated body part.

15. The aircraft set forth in claim 14 including:

low aspect ratio wings secured to said fuselage.

16. The aircraft set forth in claim 13 including:

horizontal and vertical stabilizer means mounted on said fuselage and including moveable control surfaces for controlling one of pitch and yaw, respectively, of said aircraft.

17. The aircraft set forth in claim 1 including:

movable guide vanes mounted in said duct for directing rotor wash in longitudinal directions for controlling at least one of pitch and longitudinal movement of said aircraft.

18. The aircraft set forth in claim 17 including:

longitudinally oriented guide vanes disposed in said duct for directing rotor wash laterally for controlling at least one of lateral movement, roll and yaw of said aircraft.

\* \* \* \* \*